United States Patent Office 3,351,686
Patented Nov. 7, 1967

3,351,686
INDUCTION MELTING PROCESS OF CENTRAL CORE PORTION OF CYLINDRICAL SHAPED REFRACTORY MATERIALS
Bernard Gayet and Jean Holder, Ballancourt, Gerard Kurka, Grenoble, Jean Reboux, Savigny-sur-Orge, and Jean Trouve, Versailles, France, assignors to Commissariat à l'Energie Atomique, Paris, France
Filed Jan. 28, 1964, Ser. No. 340,637
Claims priority, application France, Jan. 31, 1963, 923,338
8 Claims. (Cl. 264—.5)

This invention relates to a process for the fusion of refractory non-insulating materials by induction and to devices for carrying the said process into effect. The expression "refractory non-insulating materials" is to be understood to mean on the one hand bodies having a fusion temperature at most equal to 1900°–2000° and an electrical resistivity at least equal to several hundreds of ohms/cm.$^2$/cm. in the vicinity of the fusion temperature and, on the other hand, mixtures (which have a resistivity complying with this condition) of such bodies with other refractory substances the electrical resistance of which is greater than the above-mentioned maximum and which for this reason would not be suitable for the direct carrying into effect of the process according to the invention.

Among other bodies constituting non-refractory materials in the sense of the definition given hereinabove, reference can be made to numerous oxides, carbides, nitrides, metal silicides, and notably the following bodies:

| Oxides | Approximate fusion temperature, ° C. | Resistivity near fusion |
|---|---|---|
| Uranium dioxide, $UO_2$ | 2,800 | 0.01 to 0.1 ohm, cm.$^2$/cm. |
| Zirconium dioxide, $ZrO_2$ | 2,700 | 1 to 50 ohms, cm.$^2$/cm. |
| Thorium dioxide, $ThO_2$ | 3,300 | |
| Titanium oxide Rutile, $TiO_2$ | 1,950 | 0.001 to 0.01 ohm, cm.$^2$/cm. |
| Cerium oxide, $CeO_2$ | 2,800 | |

Carbides—Uranium monocarbide (UC), Plutonium monocarbide (PuC).

The invention may also be used with mixtures of one of the above-listed oxides with those such as MgO and BeO, the resistivity of which is excessively high.

It is already known to heat a metal or alloy ingot while simultaneously subjecting the outer surface thereof to forced cooling in such manner that only the central portion of the ingot reaches the melting point; thus, only the central portion melts, leaving a solid crust which retains the molten metal and constitutes a crucible having, relatively to a separate crucible made of a different material, the advantage that it does not pollute the molten material and that it separates it from the atmosphere of the induction furnace.

It has also been proposed to discharge from the crucible in which the fusion of a metal is effected at least a portion of the weight of the said metal by subjecting the body to the action of a magnetic field the characteristics of which are such that it sets up in the mass which is undergoing fusion electric currents the interaction of which with the field results in a force the direction of which opposes the weight of the metal; this method is called "inductive levitation."

None of the solutions mentioned hereinabove has hitherto been applied to the non-insulating refractory materials defined hereinabove, essentialy due to their high resistivity at ambient temperature which prevents heating by direct induction in these bodies starting from ambient temperature.

The present invention relates to a fusion process applicable to non-insulating refractory materials and by means of which it is possible to leave a lateral crust which plays the part of a crucible.

To this end, the invention proposes a process for the fusion by induction of materials having a fusion temperature at least equal to 1900° C. and an electrical resistivity at least equal to several hundreds of ohms-cm.$^2$/cm. in the vicinity of the fusion point and preferably comprised between 100 and 0.001 ohms-cm.$^2$/cm., in which said process the material to be melted is put in the form of a substantially cylindrical sample and there is passed through an induction coil disposed about the said sample a current the frequency of which is such that the ratio between the radius and the depth of penetration of the current into the body shall be at least equal to 1.5 and preferably 1.5 and 3 in the vicinity of the fusion point.

The invention also relates, in a preferred embodiment, to a process for obtaining non-insulating refractory materials, such as oxides and carbides, in the form of grains having a density close to the theoretical density starting from powder. An important application (which is, however, not exclusive) of this mode of carrying the invention into effect consists in the preparation of grains of oxides, carbides and nitrides of uranium or plutonium of a density which is near to the theoretical value and of high purity, and which are intended for the manufacture of fuel elements. To this end, the invention proposes a process consisting in compressing the powder of the said material in the form of a substantially cylindrical sample, in passing through an induction coil disposed about the said sample a current the frequency of which is such that the ratio between the radius and the depth of penetration of the current into the body shall be at least equal to 1.5 and preferably between 1.5 and 3 in the vicinity of fusion, until the fusion of a central nucleus of the sample has been attained, in allowing the sample to cool, in (advantageously) eliminated the portion which has not undergone fusion, and in crushing the nucleus until the desired grain size is attained.

In order that it may be suitable for carrying the invention into effect, the material must exhibit a sufficiently low degree of thermal conductivity and, in practice, 0.05 cal./sec./° C./cm. constitutes a limit value.

The invention also relates to a certain number of arrangements which will advantageously be used in combination with the above-discussed arrangements but which may be used independently. The invention will be more readily understood on reading the following description, with reference to the accompanying drawings showing, by way of example, various methods of carrying the invention into effect, and wherein.

Figure 1:
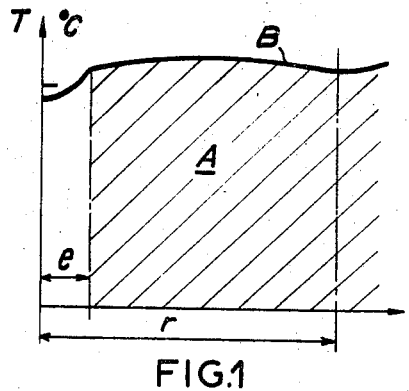
FIGURE 1 is a curve showing the approximate distribution, at equilibrium, of temperatures in a zirconium dioxide cylinder, when the process according to the invention is applied thereto.

In FIGURE 1, which shows the distribution of the temperatures maintained by induction heating in accordance with the invention in a cylindrical zirconium dioxide sample, the temperatures have been plotted against the radial distances from the lateral surface of the sample. The axis of the sample is shown in broken lines.

In the following description and claims the expression "depth of penetration" of induced electrical current in a cylindrical sample of a given material will be used for designating the depth at which the ratio between the densities of said current and of the surface current is equal to $1./e$. The depth of penetration is expressed by the well known formula:

$$P = \frac{1}{2\pi} \cdot \sqrt{\frac{\rho \times 10^9}{\mu \cdot f}}$$

in which:

$\rho$ is the resistivity of the material in ohms-cm.$^2$/cm.
$\mu$ is a magnetic permeability of the material
$f$ is the frequency in c./sec.
P is the depth of penetration in cm.

If the permeability is near to 1, this formula can be written in the approximate form:

$$P = 5000 \sqrt{\frac{\rho}{f}}$$

Thus, a diminution in the frequency results in an increase in the depth of penetration; if the frequency $f$ is high (for example higher than 10 mc./sec. in respect of zirconium dioxide the resistivity of which near the melting point is between 1 and 50 ohms-cm.$^2$/cm.) the depth P is small and only a thin tubular "crust" of the sample will be heated even if the radius of this sample is several centimetres. Since the external surface is cooled by radiation and by convection, only an annular zone of the material comprised between a central core and an external "skin" will be brought to a temperature higher than the melting point and liquefied.

If, on the contrary, the frequency is low (a few kc./sec. for zirconium dioxide) the currents set up by induction in this sample and the heat liberated by these currents is too weak to allow the material to be economically maintained at its fusion temperature.

If, finally, according to the invention, the heating frequency is fixed at a value such that the ratio between the radius $r$ and the depth of penetration P shall be higher than 1.5 and preferably less than 3, this being a value at which the action of the currents is perceptible as far as the axis of the sample, fusion of a central core takes place; for a 25 mm. diameter zirconium dioxide sample, the distribution of the temperatures for a frequency of 5 mc./sec. exhibits the form indicated in FIGURE 1; the thickness $e$ of the "skin" surrounding the melting core depends on the thermal conductivity of the material and above all on the losses due to radiation and convection, an increase in these losses resulting in an increase in the thickness $e$.

The other figures show, by way of example, two methods of effectively carrying the process according to the invention into effect.

Figure 3:
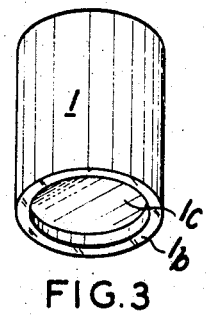
FIGURES 2 and 3 show, in perspective, two cylindrical samples of uranium dioxide $UO_2$ prepared for treatment by the process according to the invention.
Figure 2:
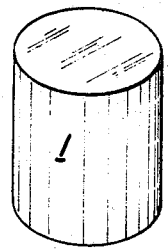
Figure 4:
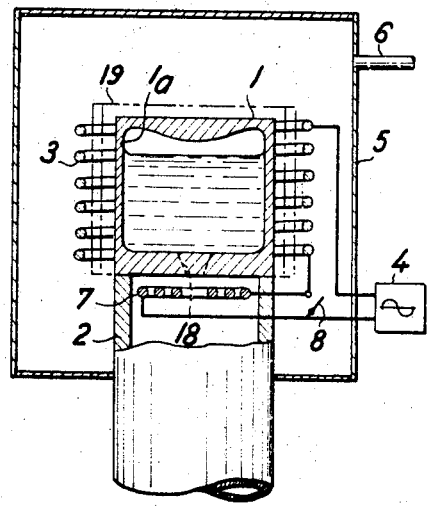
FIGURE 4 shows a furnace for induction fusion, in section in a plane extending through its vertical axis, and containing a sample of the type illustrated in FIGURE 2.

FIGURES 2, 3 and 4 illustrate a method of carrying the invention into effect applied to the densification of uranium dioxide according to which the fusion of the mass to be treated as a whole is effected in a single stage.

A sample 1, which is substantially a cylinder of revolution, is prepared from the powder to be compacted. This operation is effected for example under a pressure of the order of $4t$/cm.$^2$ and the result is a sample having a density of the order of 6. The height and diameter of the sample are advantageously between 15 and 100 mm. and of the same order.

The furnace illustrated in FIGURE 4 and which is intended to receive the sample 1 shown in FIGURE 2 comprises a hollow support and a vertical-axis winding 3 connected to a source of alternating current of radio-electrical frequency. The support and the winding are disposed in a fluid-tight envelope 5 connected by a conduit 6 to a vacuum pump and to a circuit for supplying a neutral or reducing gas.

(a) In the case wherein the fusion is to be followed by pouring, the furnace is advantageously provided with an auxiliary winding 7 of flat shape and adapted to be connected in series with the winding 3 and by means of a switch 8 arranged externally of the envelope 5. The auxiliary winding 7 is disposed within the support 2, under the sample 1.

In this case, the sequence of operations is as follows: the sample 1 is placed in position on a support 2, the chamber 5 is evacuated, then the hydrogen or helium (with argon there is a risk of striking-excitation, building-up) is introduced.

The heating is then effected by feeding the winding 3 alone. In view of the practical impossibility of inducing currents of sufficient intensity in the sample 1 at ambient temperature, due to its inadequate electrical conductivity, the pre-heating of the body up to approximately 1200° C. can be effected only by the employment of various contrivances. A first solution consists in surrounding the body with a sleeve 19 called a "susceptor" and shown in broken lines in FIGURE 3, made of a material which is a conductor for electricity (for example molybdenum or graphite). This sleeve is heated by induction and radiates toward the sample 1. Once the latter is at a temperature which is sufficiently high to ensure that its electrical conductivity will permit the induction therein of relatively high currents, the sleeve 19 is removed without opening the furnace, by members which are not shown, and the fusion of the core has been effected.

If the frequency of the currents has been suitably selected (4 to 5 mc./sec. in the case envisaged) the central core of the sample 1 is liquefied, its temperature passing beyond the fusion point of uranium dioxide (substantially 2800° C.), but there are left a lateral "skin" $1a$, a base and a "ceiling" of slight thickness (of the order of 1 to 2 mm.) which prevent the liquefied mass from escaping and separate it from the atmosphere obtaining in the envelope 5.

In place of a susceptor sleeve 19, it will be possible to use for the pre-heating of the body 1 a cylindrical conducting unit (block) 1 made of molybdenum or graphite for example and having dimensions of the same order as those of the sample 1. This unit is disposed on the upper face of the sample 1 and then the winding 3 is disposed about it and energised so as to induce currents in the unit; the unit is heated and a thermal flow passes from the unit into the sample 1 by convection. Once the sample has reached a sufficient temperature, the winding 3 has descended about the sample 1 and the unit is removed. The rest of the operation is unchanged.

In both cases, the winding 3 is maintained energised during a sufficient time to bring about the complete fusion of the core and the possible volatilisation of the impurities contained therein. The switch 8 is then operated, and this feeds the auxiliary winding 7.

The winding 7, when it is energised, selectively heats the bottom of the sample 1 and brings its centre to fusion, forming an orifice 18 therein; as soon as this fusion has taken place, the entire mass of the core flows by gravity through the orifice 18 and the hollow support 2 and is recovered in an ingot mould (not shown) disposed at the base of the said support.

The hollow and perforated shell consisting of the skin $1a$ which has remained solid is then evacuated. The operations for the placing in position of the sample 1 and the evacuation of the shell can of course be automatically carried into effect.

The mass of uranium oxide recovered in the ingot mould has a density comprised between 10.8 and 10.9 and which is extremely close to the theoretical density. The crushing of the mass, once it has been cooled, permits the obtaining of extremely compact and pure grains.

(b) If it is desired to effect the compaction in situ, whilst maintaining the mass liquefied within the "skin," the operation is effected without using an auxiliary winding 7. It suffices, after having maintained the core in the state of fusion during an adequate period of time, to allow this sample to cool in situ by interrupting the energisation of the winding 3. The liquefied core solidifies again, splitting up by formation of cracks. Once the sample 1 has cooled, the "skin" which has not undergone fusion, is eliminated so as to retain only the core which can be crushed in the form of granules having a density near to the theoretical density. In this case, it is of course not necessary that the support 2 should be hollow.

(c) It is also possible to extract the mass of the liquefied core out of the skin without using an auxiliary winding 7 and even in certain cases a susceptor sleeve or similar device.

It suffices to give the sample the form illustrated in FIGURE 3; this sample differs from that shown in FIGURE 2 only by the presence of a dish portion in its lower portion, this dish portion having a rim 1b the thickness of which is of the same order as that of the skin so provided as to subsist during the treatment. In this case, the fusion and the casting are effected simultaneously. The more rapid heating of the lower portion of the sample brings about the fusion of the base 1c of the dish portion, with progressive deepening thereof accompanied by the flowing of the liquefied mass into the ingot mould (not shown).

It is possible to use a body having the shape illustrated in FIGURE 3, turned in such way that the dish portion is formed in its upper face, if it is desired to effect the "drawing" of the crystals of the material. It then suffices to immerse in the fusion zone a germ which is progressively raised so as to bring about the crystallisation of the liquid mass extracted from the core.

The sample illustrated in FIGURE 4, like that shown in FIGURE 2, can be prepared by the compression of a powder followed (if appropriate) by pre-sintering and a machining process the object of which is to impart precise shape.

The same processes can be applied, with frequencies of the same order, to the other oxides already mentioned and having similar properties (notably electrical resistivity). They may also be applied to carbides and to nitrides the higher conductivity of which involves the utilisation of frequencies which are lower, generally by a few kc./sec. The process has notably been applied to the treatment of uranium carbide UC under a secondary vacuum with a heating frequency comprised between 1 and 10 kc./sec. When the process is applied to the compaction of a sample of sintered carbide, the latter is advantageously subjected to previous rough fusion with the aid of an arc, so as to avoid risk of bursting.

Figure 5:
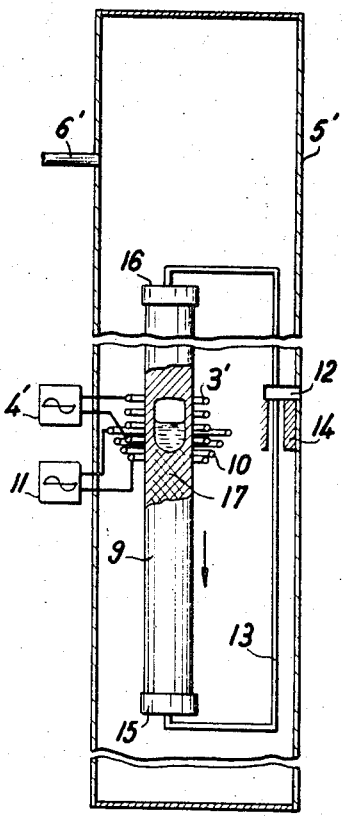
FIGURE 5 shows, in vertical diagrammatic section, a cylindrical bar and a device for the progressive densification by fusion of the core of the said bar from one end to the other thereof.

The method of carrying the invention into effect illustrated in FIGURE 5 corresponds to continuous zone fusion (i.e. no longer in a block), the liquefied mass of the nucleus remaining in the core where it is successively liquefied and then solidified.

In order to carry the process into effect in accordance with this embodiment, a cylindrical bar or rod 9 which is a body of revolution and which is made of uranium dioxide for example, is prepared, its length being several tens of centimetres and its diameter between 15 and 100 mm.

The said bar or rod 9 is disposed vertically and, after the base has been pre-heated by means of a source of radiation heat, the said bar is axially disposed in the centre of a heating winding 3' similar to the one described hereinabove and of a so-called "levitation" winding 10 having the general shape of a conical dish the concavity of which is upwardly orientated, the entire assembly being enclosed in a vacuum envelope 5' connected by a conduit 6' to a vacuum pump and a means for feeding with a neutral gas.

A source 4' feeds the winding 3' with a heating current the frequency of which is between 5 and 10 mc./sec. A further source 11 feeds the winding 10 with a further current the frequency of which is less than the previous one (for example of the order of 100 to 1000 kc./sec.).

When the two windings have been fed, a central core of the lower portion of the bar or rod 9 is melted by the induced currents generated from the winding 3; the liquefied core remains electromagnetically supported by the winding 10, thus reducing the pressure exerted by the liquefied mass on the thin outer skin which has remained solid. The bar is then uniformly displaced in accordance with the axis of the winding 3. FIGURE 5 shows an entrainment mechanism represented diagrammatically by the rectangle 12 which displaces a framework 13 mounted in such manner as to be able to slide vertically in a fixed guide 14; the said framework comprises a plate 15 on which bears the base of the bar and a gripper member 16 supporting the top of the said bar.

The core of the lower portion of the bar 9 solidifies to form a mass divided up by cracks into a series of homogeneous blocks the density of which is higher than that of the initial bar, whereas the core of a higher portion of the bar is liquefied; thus, the entire bar can be treated.

The travelling-past velocity may be much higher than that which is permissible in the conventional processes of purification by zone-wise fusion the purpose of which it is to assemble the impurities in the end portions of a bar. It is, in fact, necessary in this case that fusion should be continued during a sufficient time to enable the impurities to pass from the solid phase to the liquid phase through the contact surface. In this case, on the contrary, the travel-past velocity may attain 4 cm./mm.

Once the treatment has been terminated and the bar cooled, the skin which has not undergone fusion can be eliminated.

Of course, instead of displacing the bar relatively to the windings, it would also be possible to displace the windings rapidly along the bar.

The support for the sample 1 shown in FIGURES 3 and 4 could be provided at least in part by levitation means similar to the winding 10 (FIGURE 5), casting then being controlled by simple deenergisation of the said winding; other variations are of course possible.

We claim:

1. In a process for fusion by induction of a refractory non-insulating material having a melting temperature at least equal to 1900° C., a thermal conductivity which is less than 0.05 cal./sec. ° C./cm. and an electrical resistivity comprised between 100 and 0.001 ohms-cm.$^2$/cm. near the melting point of said material, the steps of preheating a central longitudinal part at least of a substantially cylindrical sample of said material to a temperature adjacent to the melting point thereof and subjecting said sample to a magnetic field substantially coaxial thereto, the frequency of said field having a value such that the ratio between the radius of the sample and the depth of penetration of the current induced by said field in said sample is between 1.5 and 3, for a time sufficient to melt a central core of said sample.

2. A process as described in claim 1 wherein electrically conductive means are located in said magnetic field in heat conductive relation to said sample until said sample has been heated to a temperature close to its fusion point.

3. A process as described in claim 2 including the step of removing the part of the sample outside the core and then crushing the core.

4. In a process for preparing a dense powder of a refractory non-insulating material having a melting temperature at least equal to 1900° C., a thermal conductivity which is less than 0.05 cal./sec./° C./cm. and an electrical resistivity between 100 and 0.01 ohms/cm.$^2$/cm. in the vicinity of the melting point, the steps of preheating a central longitudinal part of a substantially cylindrical sample of said material to a temperature adjacent to its melting point, subjecting said sample to a magnetic field substantially coaxial to said sample of such frequency that the ratio between the radius of the sample and the depth of penetration of the current into said sample is between 1.5 and 3 until a central core of said sample is molten, cooling said sample to solidify it and then crushing said sample to the desired grain size.

5. A process as described in claim 1, a central recess being formed in an endface of said sample defining an annular wall having substantially the same thickness as the portion of the sample which is not subjected to fusion.

6. A process as described in claim 1 including the further step of subjecting the base of said sample to an auxiliary magnetic field after liquefaction of the core to melt the portion of said sample under said core whereby said liquefied core flows under gravity.

7. A process as described in claim 1 including the step of displacing the sample along the magnetic field at a speed such that a central core is successively liquefied and then cooled along the entire length of said sample.

8. In a process for preparing refractory oxides as a group consisting of $UO_2$, $ZrO_2$, $ThO_2$, $TiO_2$, CeO, mixtures thereof and mixtures thereof with MgO and BeO in high density form, the steps of preheating a central longitudinal part of a cylindrical body of said oxide to a temperature adjacent to the melting point of the oxide other than by direct induction in the oxide and continuously moving said cylindrical body axially through a radio frequency electromagnetic field having an axial symmetry and having a frequency in the mc./sec. range beginning with said preheated part of said body at a speed such that a core portion of said body is melted and then is moved out of said magnetic field and freezes.

References Cited
UNITED STATES PATENTS

| | | | |
|---|---|---|---|
| 3,223,758 | 12/1965 | Fischer | 264—30 |
| 3,258,314 | 6/1966 | Redmond et al. | 13—1 X |

OTHER REFERENCES

Nuclear Science Abstracts, vol. 17, No. 6, NSA–8719, Mar. 31, 1963.

CARL D. QUARFORTH, *Primary Examiner.*

BENJAMIN R. PADGETT, *Examiner.*

S. J. LECHERT, JR., *Assistant Examiner.*